United States Patent  (10) Patent No.: US 12,175,438 B1
Franklin et al.  (45) Date of Patent: Dec. 24, 2024

(54) BURST IMAGE CAPTURE

(71) Applicant: Capital One Services, LLC, McLean, VA (US)

(72) Inventors: Keegan Franklin, Tucson, AZ (US);
Aeman Jamali, Indianapolis, IN (US);
Jordan Arrieta, Wilmington, DE (US);
Megan Obrien, New Orleans, LA (US);
Danielle Wegrzyn, Bear, DE (US);
Michael Croghan, Herndon, VA (US);
Kai Si, Monterey Park, CA (US); Sasha Ahrestani, Philadelphia, PA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 18/503,787

(22) Filed: Nov. 7, 2023

Related U.S. Application Data

(60) Provisional application No. 63/589,230, filed on Oct. 10, 2023.

(51) Int. Cl.
*G06Q 20/10* (2012.01)
*G06T 5/50* (2006.01)
*G06V 10/764* (2022.01)

(52) U.S. Cl.
CPC .......... *G06Q 20/108* (2013.01); *G06T 5/50* (2013.01); *G06V 10/764* (2022.01)

(58) Field of Classification Search
CPC ....... G06Q 20/108; G06T 5/50; G06V 10/764
See application file for complete search history.

(56) References Cited

U.S. PATENT DOCUMENTS

| 7,391,934 | B2 | 6/2008 | Goodall et al. |
| 7,421,107 | B2 | 9/2008 | Lugg |
| 7,587,066 | B2 | 9/2009 | Cordery et al. |
| 7,698,222 | B1 | 4/2010 | Bueche |
| 7,702,588 | B2 | 4/2010 | Gilder et al. |

(Continued)

OTHER PUBLICATIONS

Rose, Lydia M. "Modernizing check fraud detection with machine learning." PhD dissertation. Utica College. 2018.

(Continued)

*Primary Examiner* — Xuemei G Chen
(74) *Attorney, Agent, or Firm* — Sterne, Kessler, Goldstein & Fox P.L.L.C.

(57) ABSTRACT

Disclosed herein are system, apparatus, device, method and/or computer program product embodiments, and/or combinations and sub-combinations thereof for blending multiple images of a financial instrument (e.g., check) into a single blended image to mitigate potential image errors. The method generates a confidence score for each of the plurality of images of the financial instrument, selects, based on the confidence score, a number of images of the financial instrument, ranks the number of images, arranging them from a highest to lowest confidence score, and assigns a weighting value, such as transparency, to each image of the selected number of images of the financial instrument, based on a respective ranking. The method builds a blended image by blending pixel content of common pixels, as modified by a respective weighting value, from the number of images and communicates the blended image to a remote deposit server.

17 Claims, 9 Drawing Sheets

(56) References Cited

U.S. PATENT DOCUMENTS

| | | |
|---|---|---|
| 7,856,402 B1 | 12/2010 | Kay |
| 7,905,396 B2 | 3/2011 | Tidwell et al. |
| 7,949,587 B1 | 5/2011 | Morris et al. |
| 8,027,928 B1 | 9/2011 | Hecht, Jr. et al. |
| 8,050,997 B1 | 11/2011 | Nosek et al. |
| 8,060,442 B1 | 11/2011 | Hecht et al. |
| 8,296,230 B2 | 10/2012 | Davis et al. |
| 8,300,917 B2 | 10/2012 | Borgia et al. |
| 8,406,500 B2 | 3/2013 | Najari et al. |
| 8,464,933 B1 | 6/2013 | Prasad et al. |
| 8,582,862 B2 | 11/2013 | Nepomniachtchi et al. |
| 8,605,982 B2 | 12/2013 | Jackson et al. |
| 8,638,363 B2 | 1/2014 | King et al. |
| 8,660,952 B1* | 2/2014 | Viera .................... G06Q 20/108 705/42 |
| 8,708,227 B1 | 4/2014 | Oakes, III et al. |
| 8,745,073 B2 | 6/2014 | Mulligan et al. |
| 8,811,711 B2 | 8/2014 | Calman et al. |
| 8,958,605 B2 | 2/2015 | Amtrup et al. |
| 8,959,033 B1 | 2/2015 | Oakes, III et al. |
| 8,995,012 B2 | 3/2015 | Heit et al. |
| 9,064,248 B2 | 6/2015 | Huff et al. |
| 9,324,073 B2 | 4/2016 | Nepomniachtchi et al. |
| 9,384,392 B2 | 7/2016 | Weber et al. |
| 9,569,756 B1 | 2/2017 | Bueche, Jr. et al. |
| 9,640,041 B2 | 5/2017 | Block et al. |
| 9,652,690 B2 | 5/2017 | Eid et al. |
| 9,672,510 B2 | 6/2017 | Roach et al. |
| 9,721,177 B2 | 8/2017 | Lee et al. |
| 9,747,509 B2 | 8/2017 | Eid et al. |
| 9,779,392 B1 | 10/2017 | Prasad et al. |
| 9,852,406 B2 | 12/2017 | Doyle et al. |
| 10,026,119 B2 | 7/2018 | Green et al. |
| 10,192,108 B2 | 1/2019 | Nepomniachtchi et al. |
| 10,210,522 B1 | 2/2019 | Medina et al. |
| 10,217,375 B2 | 2/2019 | Waldron et al. |
| 10,402,790 B1 | 9/2019 | Clark et al. |
| 10,460,381 B1 | 10/2019 | Pollack et al. |
| 10,504,185 B1 | 12/2019 | Buentello |
| 10,540,714 B1* | 1/2020 | Taylor .................... G06Q 40/02 |
| 10,552,810 B1* | 2/2020 | Ethington ............ G06Q 20/042 |
| 10,635,898 B1 | 4/2020 | Pribble et al. |
| 10,692,230 B2 | 6/2020 | Anderson et al. |
| 10,699,146 B2 | 6/2020 | Shustorovich et al. |
| 10,706,466 B1 | 7/2020 | Ethington et al. |
| 10,762,579 B2 | 9/2020 | Riechers et al. |
| 10,769,598 B1* | 9/2020 | Oakes, III .......... H04N 1/00816 |
| 10,789,496 B2 | 9/2020 | Kotovich et al. |
| 10,853,771 B2 | 12/2020 | Enobakhare |
| 10,855,914 B1 | 12/2020 | Prasad et al. |
| 10,909,362 B2 | 2/2021 | Nepomniachtchi et al. |
| 11,064,111 B1 | 7/2021 | Prasad et al. |
| 11,127,008 B1 | 9/2021 | Buentello et al. |
| 11,145,169 B2 | 10/2021 | Pratten et al. |
| 11,157,731 B2 | 10/2021 | Nepomniachtchi et al. |
| 11,159,733 B2 | 10/2021 | Mukul |
| 11,200,550 B1 | 12/2021 | Singfield |
| 11,216,884 B1 | 1/2022 | Buentello |
| 11,244,319 B2 | 2/2022 | Navarro et al. |
| 11,282,086 B1 | 3/2022 | Medina, III et al. |
| 11,295,377 B1 | 4/2022 | Ethington et al. |
| 11,295,378 B1 | 4/2022 | Voutour et al. |
| 11,315,217 B2 | 4/2022 | Ilic et al. |
| 11,321,709 B1 | 5/2022 | Kolchin |
| 11,348,075 B1* | 5/2022 | Oakes, III ............ G06Q 20/325 |
| 11,373,150 B1 | 6/2022 | Bueche, Jr. et al. |
| 11,449,841 B1 | 9/2022 | Srinivasarangan et al. |
| 11,516,383 B2 | 11/2022 | Ilic et al. |
| 11,531,973 B1 | 12/2022 | Prasad et al. |
| 11,562,332 B1 | 1/2023 | Oakes, III et al. |
| 11,610,294 B2 | 3/2023 | Dewitt et al. |
| 11,640,627 B2 | 5/2023 | Fotso et al. |
| 11,676,285 B1 | 6/2023 | Backlund et al. |
| 11,694,268 B1 | 7/2023 | Buentello |
| 11,704,627 B2 | 7/2023 | Gordon et al. |
| 11,710,210 B1 | 7/2023 | Medina, III |
| 2003/0080958 A1* | 5/2003 | Matsumoto ........... G06T 15/405 345/421 |
| 2006/0036537 A1 | 2/2006 | Lawrence et al. |
| 2008/0140579 A1 | 6/2008 | Agarwal |
| 2009/0306885 A1* | 12/2009 | Yokoyama ........... G09B 29/106 345/592 |
| 2012/0040717 A1 | 2/2012 | Levy et al. |
| 2013/0198069 A1 | 8/2013 | Latimer |
| 2013/0204783 A1 | 8/2013 | Klose et al. |
| 2014/0074697 A1 | 3/2014 | Foster |
| 2014/0114852 A1 | 4/2014 | Rajagopal et al. |
| 2014/0122332 A1 | 5/2014 | Viera et al. |
| 2014/0270461 A1* | 9/2014 | Narendra ............... H04W 12/06 382/137 |
| 2015/0116520 A1* | 4/2015 | Baym ..................... H04N 5/44 348/211.2 |
| 2015/0120564 A1 | 4/2015 | Smith et al. |
| 2017/0099439 A1* | 4/2017 | Pulli .................... H04N 23/698 |
| 2017/0270508 A1 | 9/2017 | Roach et al. |
| 2018/0276528 A1* | 9/2018 | Lin ...................... G06V 30/274 |
| 2020/0042955 A1 | 2/2020 | Widdows |
| 2020/0389600 A1 | 12/2020 | Capurso et al. |
| 2021/0303919 A1* | 9/2021 | Niu ........................ G06T 7/001 |
| 2021/0360149 A1* | 11/2021 | Mukul .................... G06F 3/165 |
| 2021/0383558 A1* | 12/2021 | Miyazaki ................. G06T 7/74 |
| 2022/0138909 A1* | 5/2022 | Nayak ...................... G06T 5/50 382/255 |
| 2022/0245607 A1* | 8/2022 | Qualls ..................... H04N 23/74 |
| 2022/0277086 A1* | 9/2022 | Jarvis ...................... G06F 21/60 |
| 2022/0335393 A1 | 10/2022 | Gupta et al. |
| 2022/0343301 A1 | 10/2022 | Edwards et al. |
| 2022/0343474 A1* | 10/2022 | Zhang .................... G06F 18/251 |
| 2022/0358575 A1* | 11/2022 | Smith .................... G06T 7/0008 |
| 2023/0038844 A1* | 2/2023 | Li .......................... H04N 23/741 |
| 2023/0060395 A1 | 3/2023 | Roach et al. |
| 2023/0060464 A1 | 3/2023 | Ceesay |
| 2023/0084370 A1 | 3/2023 | Bradford |
| 2023/0109047 A1* | 4/2023 | Stimm ................. H04N 23/683 348/208.1 |
| 2023/0133158 A1 | 5/2023 | Kolchin |
| 2023/0196319 A1 | 6/2023 | Ng et al. |
| 2023/0196706 A1 | 6/2023 | Scott |
| 2023/0237623 A1* | 7/2023 | Glotzbach ................. G06T 5/50 382/275 |
| 2023/0281629 A1 | 9/2023 | Shevyrev et al. |
| 2023/0359057 A1* | 11/2023 | Dijkstra ............. G02B 21/0012 |
| 2023/0409631 A1* | 12/2023 | Futterman ........... G06F 16/5866 |
| 2024/0037762 A1* | 2/2024 | Zhang ..................... G16H 30/40 |

OTHER PUBLICATIONS remotedepositcapture.com, "Ensenta Business Mobile with Multi-Check", Available from the Internet at https://www.remotedepositcapture.com/RDC/media/RDC-Forum/Submitted-Sponsor-Brochures/EnsentaBusinessMobileMultiCheck-e-_2018_2_14_12_52_3.pdf, [site visited on May 19, 2023], pp. 1-2.

Bills, Steve, "Automated Amount Scanning Is Trend in Remote-Deposit," American Banker, New York, NY, Aug. 30, 2005, (3 pgs).

* cited by examiner

BURST IMAGE CAPTURE

CROSS-REFERENCE TO RELATED APPLICATIONS

This application claims priority to U.S. Provisional Patent Application 63/589,230, titled "Burst Image Capture," filed Oct. 10, 2023, which is hereby incorporated by reference in its entirety.

BACKGROUND

As financial technology evolves, banks, credit unions and other financial institutions have found ways to make online banking and digital money management more convenient for users. Mobile banking apps may let you check account balances and transfer money from your mobile device. In addition, a user may deposit paper checks from virtually anywhere using their smartphone or tablet. However, users need to take images with, for example, a scanner of the check to have them processed remotely.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
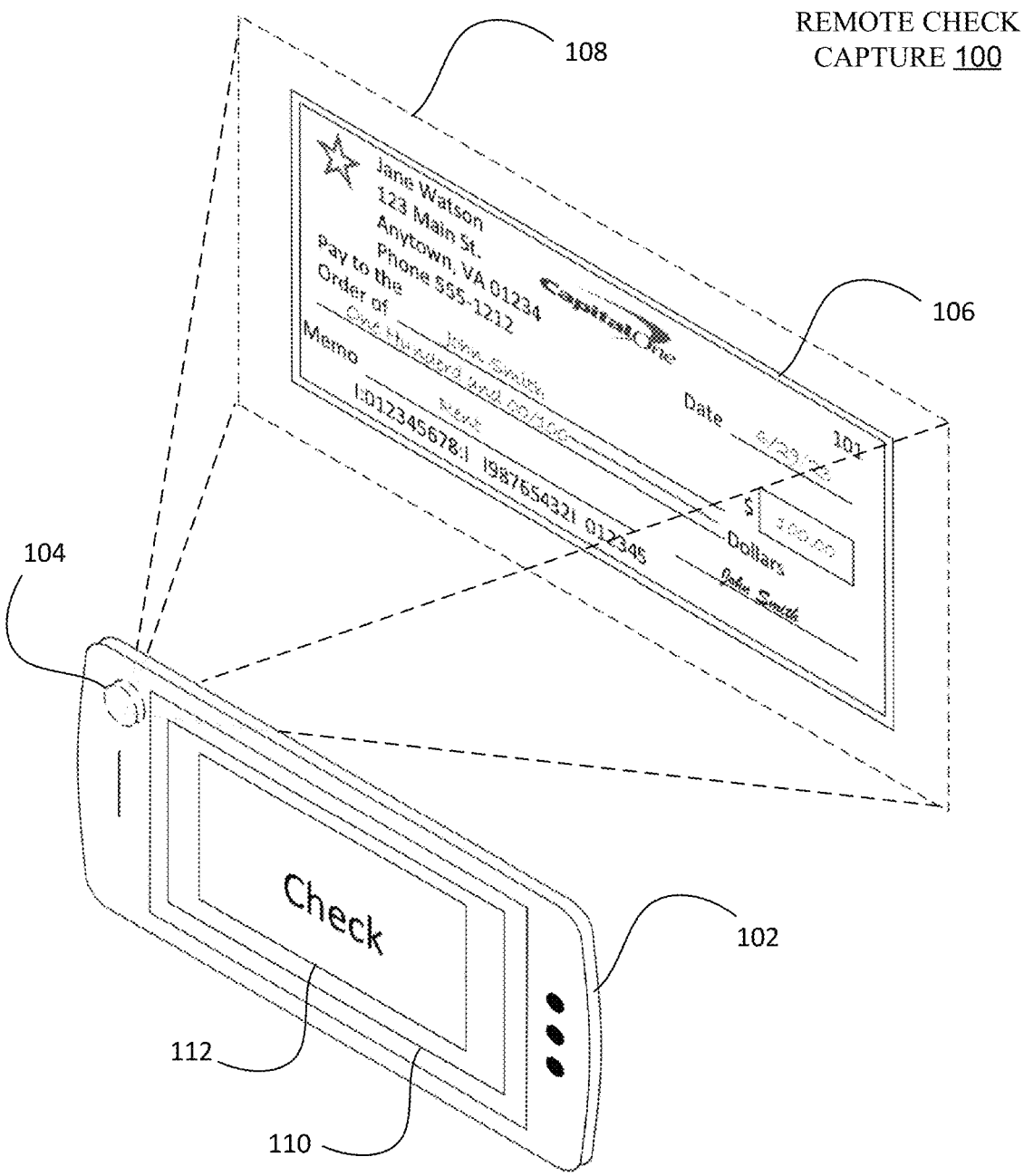
FIG. 1 illustrates an example remote deposit check capture, according to some embodiments and aspects.

Disclosed herein are system, apparatus, device, method and/or computer program product embodiments, and/or combinations and sub-combinations thereof for configuring multiple images of a financial instrument (e.g., check) into a single blended image to mitigate potential image quality errors. The technology disclosed herein overcomes low quality imagery rejections by overlaying individual images until achieving an acceptable quality threshold based on blending of common pixels between images. In some embodiments, the blending of multiple images is implemented locally on a client device (e.g., customer's smartphone) and the blended image is communicated to a remote system for remote deposit processing. In some embodiments, multiple images are communicated to the remote system and the blended image instantiated with subsequent remote deposit processing.

Mobile check deposit is a fast, convenient way to deposit funds using a customer's mobile device or laptop. As financial technology and digital money management tools continue to evolve, the process has become safer and easier than ever before. Mobile check deposit is a way to deposit a financial instrument, e.g., a paper check, through a banking app using a smartphone, tablet, laptop, etc. Currently, mobile deposit allows a bank customer to capture a picture of a check using, for example, their smartphone or tablet camera and upload it through a mobile banking app running on the mobile device. Deposits commonly include personal, business or government checks.

Most banks and financial institutions use advanced security features to keep an account safe from fraud during the mobile check deposit workflow. For example, security measures may include encryption and device recognition technology. In addition, remote check deposit apps typically capture check deposit information without storing the check images on the customer's mobile device (e.g., smartphone). Mobile check deposit may also eliminate or reduce typical check fraud as a thief of the check may not be allowed to subsequently make use of an already electronically deposited check, whether it has cleared or not and may provide an alert to the banking institution of a second deposit attempt. In addition, fraud controls may include mobile security alerts, such as mobile security notifications or SMS text alerts, which can assist in uncovering or preventing potentially fraudulent activity.

Currently, computer-based (e.g., laptop) or mobile-based (e.g., mobile device) technology allows a customer to initiate a financial document uploading process for uploading images or other electronic versions of a document to a backend system (e.g., a document processing system) for various purposes. Once initiated, the document upload process continues until the check image has been uploaded. However, low quality images may require additional captures and uploads from the customer.

The technology described herein, in the various embodiments and aspects, generates a blended image of a financial instrument for a customer remote deposit. In one aspect, the blended image is derived from a live image stream present in the field of view of a camera or buffered within memory of the mobile device memory, such as in a frame or video buffer. This technology eliminates technical problems associated with remote deposits receiving low quality imagery that may be rejected during remote deposit processing. These problems may be revealed by cancellations or additional requests to recapture images of the check, or a customer taking it to another financial institution, causing a potential duplicate presentment fraud issue.

The technology described herein in the various embodiments and aspects implements a pre-deposit processing of imagery present in the camera's field of view, where, in one aspect embodiment, the imagery is configured as a stream of live or continuously observed imagery. This imagery may be processed continuously, for example, in real-time, without first capturing an image in memory, or alternatively, the imagery may be stored temporarily within memory of the mobile device memory, such as, in a frame or video buffer. In one aspect, the live camera imagery is streamed as encoded data configured as a byte array (e.g., as a Byte Array Output Stream object). The byte array is a group of contiguous (side-by-side) bytes, for example, forming a bitmap image.

While described throughout for blended image building on the client device, the live stream of imagery may be communicated to one or more remote computing devices or cloud-based systems for performing these functions.

Figure 3:
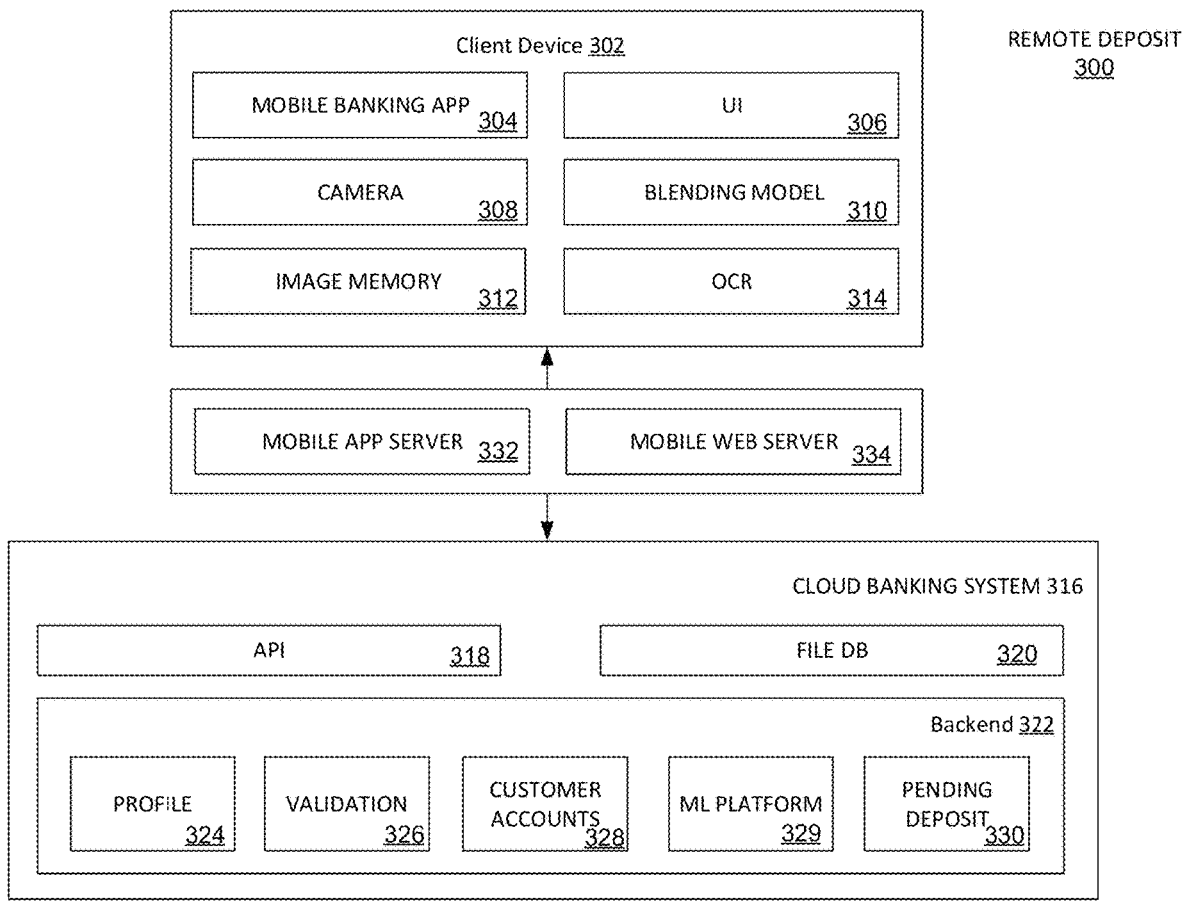
FIG. 3 illustrates an example flow diagram of a remote deposit system, according to some embodiments and aspects.
Figure 4:
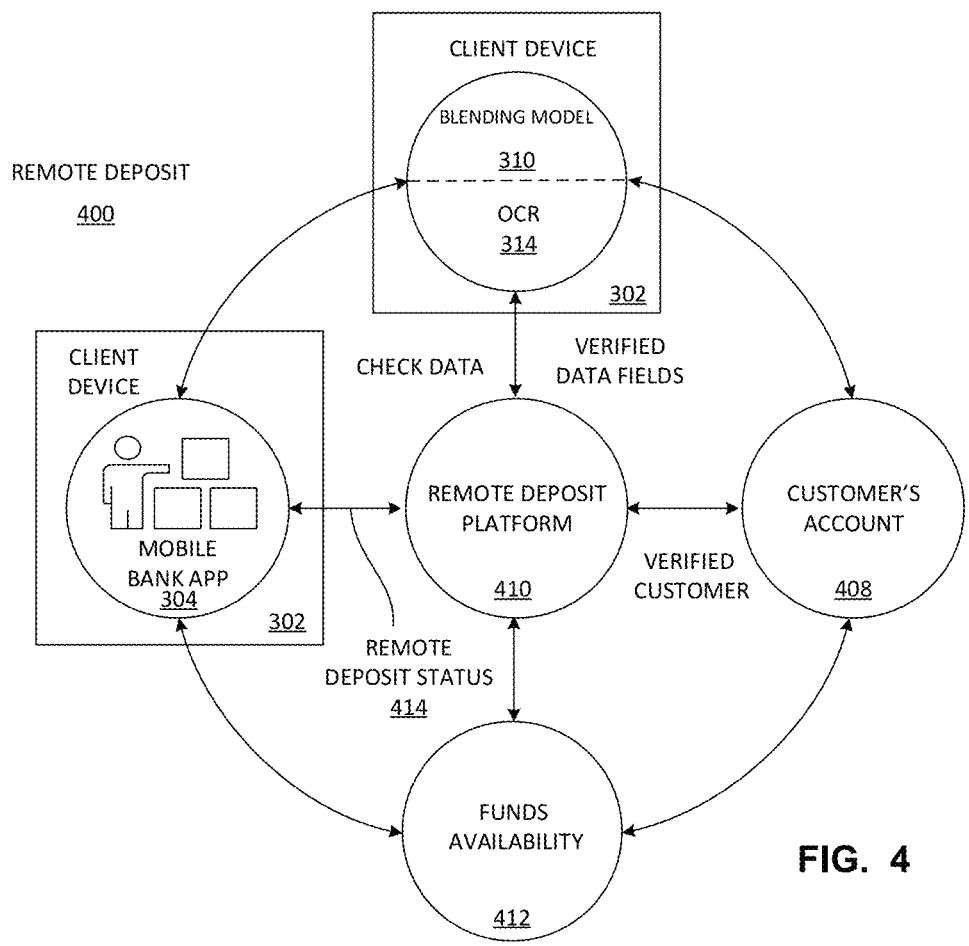
FIG. 4 illustrates a state diagram of a remote deposit system, according to some embodiments and aspects.
Figure 5:
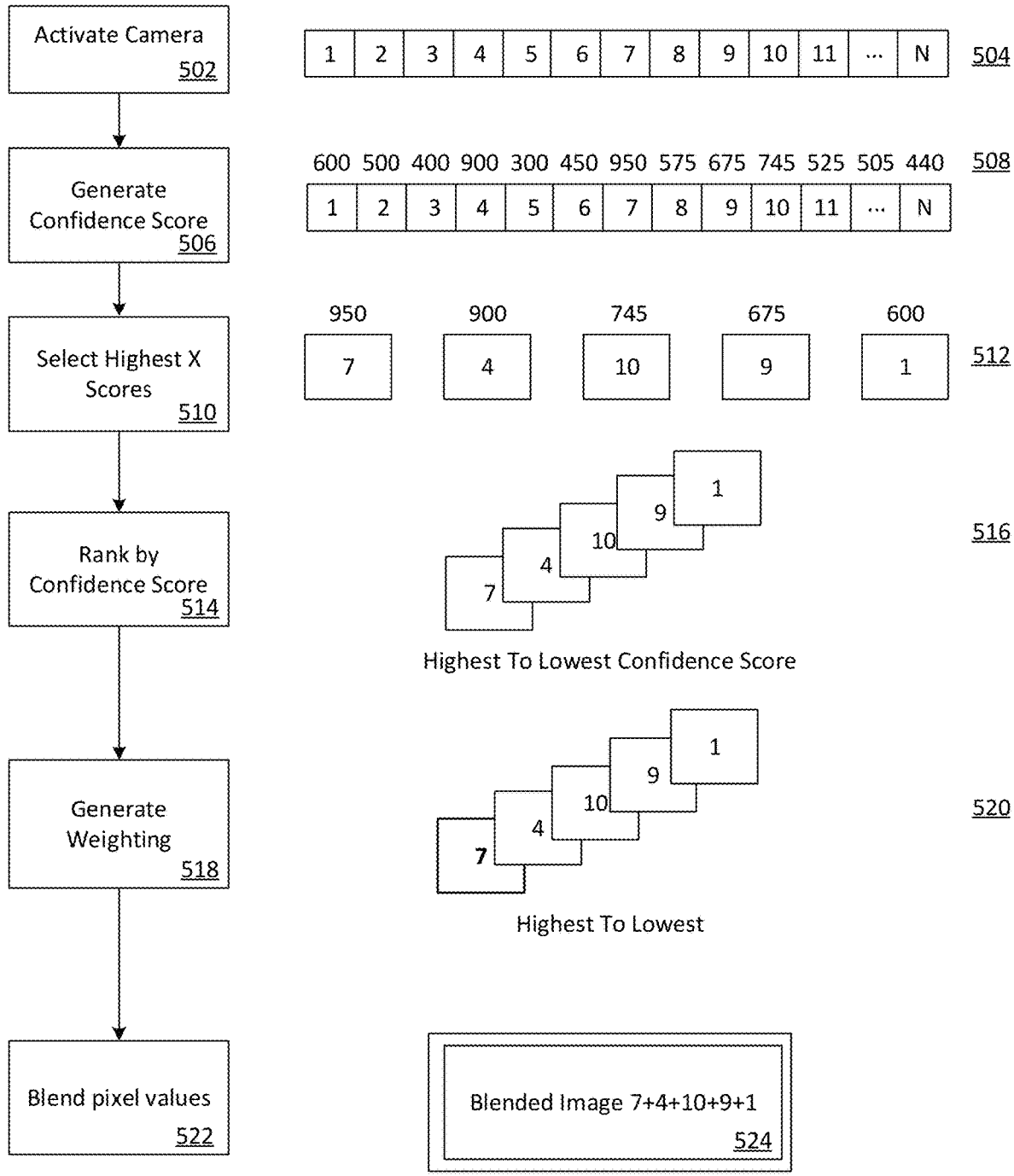
FIG. 5 illustrates an example diagram of a blended image build, according to some embodiments and aspects.

Various aspects of this disclosure may be implemented using and/or may be part of a remote deposit systems shown in FIGS. 3-5. It is noted, however, that this environment is provided solely for illustrative purposes, and is not limiting. Aspects of this disclosure may be implemented using and/or may be part of environments different from and/or in addition to the remote deposit system, as will be appreciated by persons skilled in the relevant art(s) based on the teachings contained herein. An example of the remote deposit system shall now be described.

FIG. 1 illustrates an example remote check capture 100, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 1, as will be understood by a person of ordinary skill in the art.

Sample check 106, may be a personal check, paycheck, or government check, to name a few. In some embodiments, a customer will initiate a remote deposit check capture from their mobile computing device (e.g., smartphone) 102, but other digital camera devices (e.g., tablet computer, personal digital assistant (PDA), desktop workstations, laptop or notebook computers, wearable computers, such as, but not limited to, Head Mounted Displays (HMDs), computer goggles, computer glasses, smartwatches, etc., may be substituted without departing from the scope of the technology disclosed herein. For example, when the document to be deposited is a personal check, the customer will select a customer account at the bank account (e.g., checking or savings) into which the funds specified by the check are to be deposited. Content associated with the document include the funds or monetary amount to be deposited to the customer account, the issuing bank, the routing number, and the account number. Content associated with the customer account may include a risk profile associated with the account and the current balance of the account. Options associated with a remote deposit process may include continuing with the deposit process or cancelling the deposit process, thereby cancelling depositing the check into the account.

Mobile computing device 102 may communicate with a bank or third party using a communication or network interface (not shown). Communication interface may communicate and interact with any combination of external devices, external networks, external entities, etc. For example, communication interface may allow mobile computing device 102 to communicate with external or remote devices over a communications path, which may be wired and/or wireless (or a combination thereof), and which may include any combination of LANs, WANs, the Internet, etc. Control logic and/or data may be transmitted to and from mobile computing device via a communication path that includes the Internet.

In an example approach, a customer will login to their mobile banking app, select the account they want to deposit a check into, then select, for example, a "deposit check" option that will activate their mobile device's camera 104. One skilled in the art would understand that variations of this approach or functionally equivalent alternative approaches may be substituted to initiate a mobile deposit.

Using the camera 104 function on the mobile computing device 102, the customer captures live imagery from a field of view 108 that includes at least an image 112 of a portion of one side of a check. Typically, the camera's field of view 108 will include at least the perimeter of the check. However, any camera position that generates in-focus imagery of the various data fields located on a check may be considered. Resolution, distance, alignment, and lighting parameters may require movement of the mobile device until a proper view of a complete check, in-focus, has occurred. An application running on the mobile computer device may offer suggestions or technical assistance to guide a proper framing of a check within the banking app's graphically displayed field of view window 110, displayed on a User Interface (UI) instantiated by the mobile banking app. A person skilled in the art of remote deposit would be aware of common requirements and limitations and would understand that different approaches may be required based on the environment in which the check viewing occurs. For example, poor lighting or reflections may require specific alternative techniques. As such, any known or future viewing or capture techniques are considered to be within the scope of the technology described herein. Alternatively, the camera can be remote to the mobile computing device 102. In an alternative embodiment, the remote deposit is implemented on a desktop computing device with an accompanying digital camera.

Sample customer instructions may include, but are not limited to, "Once you've completed filling out the check information and signed the back, it's time to view your check," "For best results, place your check on a flat, dark-background surface to improve clarity," "Make sure all four corners of the check fit within the on-screen frame to avoid any processing holdups," "Select the camera icon in your mobile app to open the camera," "Once you've viewed a clear image of the front of the check, repeat the process on the back of the check," "Do you accept the funds availability schedule?," "Swipe the Slide to Deposit button to submit the deposit," "Your deposit request may have gone through, but it's still a good idea to hold on to your check for a few days," "keep the check in a safe, secure place until you see the full amount deposited in your account," and "After the deposit is confirmed, you can safely destroy the check." These instructions are provided as sample instructions or comments but any instructions or comments that guide the customer through a remote deposit session may be included.

Figure 2:
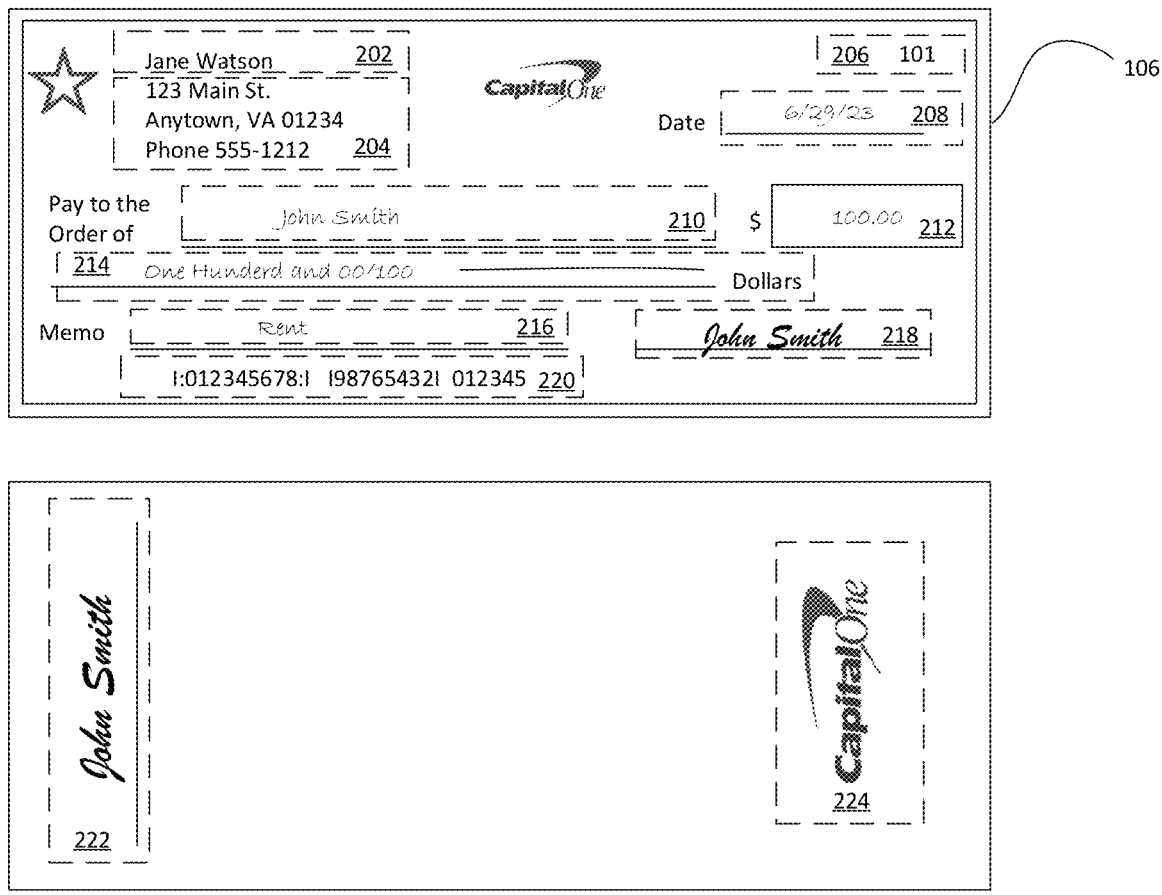
FIG. 2 illustrates example remote deposit segmentation, according to some embodiments and aspects.

FIG. 2 illustrates example remote deposit segmentation, according to some embodiments and aspects. Depending on check type, a check may have a number of identifiable fields. In one non-limiting example, the blended check imagery, as disclosed herein, may be used in an Optical Character Recognition (OCR) process to extract the various data fields of a check. For example, a standard personal check may have front side fields, such as, but not limited to, a payer customer name 202 and address 204, check number 206, date 208, payee field 210, payment amount 212, a written amount 214, memo line 216, Magnetic Ink Character Recognition (MICR) line 220 that includes a string of characters including the bank routing number, the payer customer's account number, and the check number and finally the payer customer's signature 218. Back side identifiable fields may include, but are not limited to, payee signature 222 and security fields 224, such as a watermark.

While a number of fields have been described, it is not intended to limit the technology disclosed herein to these specific fields as a check may have more or less identifiable fields than disclosed herein. In addition, security measures may include alternative approaches discoverable on the front side or back side of the check or discoverable by processing of identified information. For example, a remote deposit feature in a mobile banking app running on mobile device 102 may determine whether the payment amount 212 and the written amount 214 are the same. Additional processing may be needed to determine a final amount to process the check if the two amounts are inconsistent. In one non-limiting example, the written amount 214 may supersede any amount identified within the amount field 212.

In one aspect embodiment, blended check image building may include implementing instructions resident on the customer's mobile device to process a set of images of the check. In one non-limiting example, the customer holds their smartphone over a check (or checks) to be deposited remotely while the streaming camera imagery is continuously processed until a blended check image meeting a quality threshold has been achieved.

As will be described in greater detail in association with FIG. 8, artificial intelligence (AI), such as machine-learning (ML) systems may train a blended check model(s) to recognize a level of quality of pixels capturing characters, numerals, or other check data within a set of images, individually (e.g., each image) as well as together in a blended check image build. The blended check model(s) may be resident on the mobile device and may be integrated with or be separate from the banking application. Alternatively, or in addition to, the blended check model(s) may be resident on a remote check deposit platform.

In some aspects, the blended check model(s) may be continuously updated by future transactions used to train the blended check model(s). ML involves computers discovering how they can perform tasks without being explicitly programmed to do so. ML includes, but is not limited to, artificial intelligence, deep learning, fuzzy learning, supervised learning, unsupervised learning, etc. Machine learning algorithms build a model based on sample data, known as "training data," in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning).

A machine-learning engine may use various classifiers to map concepts associated with a specific blended image building process to capture relationships between concepts (e.g., image clarity vs. recognition of specific characters or numerals) and a post-processing OCR success history. The classifier (discriminator) is trained to distinguish (recognize) variations. Different variations may be classified to ensure no collapse of the classifier and so that variations can be distinguished.

In some aspects, machine learning models are trained on a remote machine learning platform (e.g., see FIGS. 3 and 8, element 329) using other customer's transactional information (e.g., previous successful or failed blended check images). In addition, large training sets of the other customer's historical information may be used to normalize prediction data (e.g., not skewed by a single or few occurrences of a data artifact). Thereafter, predictive model(s) may classify a specific blended image against the trained predictive model to predict required imagery quality and generate or enhance a previous blended check model(s) based on provided metadata (resolution, focal length, etc.). In one embodiment, the blended check models are continuously updated as new financial transactions occur.

In some aspects, a ML engine may continuously change weighting of model inputs to increase customer interactions with the blended image build procedures. For example, weighting of specific image metadata may be continuously modified in the model to trend towards greater success. Conversely, term weighting that lowers successful blended image results may be lowered or eliminated.

FIG. 3 illustrates a remote deposit system architecture 300, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

As described throughout, a client device 302 (e.g., mobile computing device 102) implements remote deposit processing for one or more financial instruments, such as checks. The client device 302 is configured to communicate with a cloud banking system 316 to complete various phases of a remote deposit as will be discussed in greater detail hereafter.

In aspects, the cloud banking system 316 may be implemented as one or more servers. Cloud banking system 316 may be implemented as a variety of centralized or decentralized computing devices. For example, cloud banking system 316 may be a mobile device, a laptop computer, a desktop computer, grid-computing resources, a virtualized computing resource, cloud computing resources, peer-to-peer distributed computing devices, a server farm, or a combination thereof. Cloud banking system 316 may be centralized in a single device, distributed across multiple devices within a cloud network, distributed across different geographic locations, or embedded within a network. Cloud banking system 316 can communicate with other devices, such as a client device 302. Components of cloud banking system 316, such as Application Programming Interface (API) 318, file database (DB) 320, as well as backend 322, may be implemented within the same device (such as when a cloud banking system 316 is implemented as a single device) or as separate devices (e.g., when cloud banking system 316 is implemented as a distributed system with components connected via a network).

Mobile banking app 304 is a computer program or software application designed to run on a mobile device such as a phone, tablet, or watch. However, in a desktop application, a desktop equivalent of the mobile banking app may be configured to run on desktop computers, and web applications, which run in mobile web browsers rather than directly on a mobile device. Applications or apps are broadly classified into three types: native apps, hybrid, and web apps. Native applications may be designed specifically for a mobile operating system, such as iOS or Android. Web apps are designed to be accessed through a web browser. Hybrid apps may be built using web technologies such as JavaScript, CSS, and HTML5, and function like web apps disguised in a native container.

Financial instrument imagery may originate from any of, but not limited to, image streams (e.g., series of pixels or frames) or video streams or a combination of any of these or future image formats. A customer using a client device 302, operating a mobile banking app 304 through an interactive UI 306, frames at least a portion of a check (e.g., identifiable fields on front or back of check) with a camera (e.g., field of view). In one aspect, imagery is processed from live stream check imagery from camera 308, as communicated from a camera over a period of time, until a blended image operation has been completed (e.g., a success or a failure). In one aspect, the camera imagery is streamed as encoded text, such as a byte array. Alternatively, or in addition to, the live imagery is buffered by storing (e.g., at least temporarily) as images or frames in computer memory. For example, live streamed check imagery from camera 308 is stored locally in image memory 312, such as, but not limited to, a frame buffer, a video buffer, a streaming buffer, or a virtual buffer.

Mobile banking application (app) 304, resident on client device 302, includes a computer instruction set to provide a secure mobile device banking session. The banking app allows a customer to interact with their bank account information. For example, common functions include, but are not limited to, checking an account balance, transferring money between accounts, paying bills, making deposits, to name a few.

When user desires to make a remote deposit of a check, they open the mobile banking app 304 and initiate a bank deposit by selecting a graphic from the UI 306. The banking app will activate a camera, so that imagery may be captured from the camera. The camera may include a Hypertext Transfer Protocol (HTTP) port number used by the camera to provide a data stream to processing elements of the mobile device. HTTP is an application layer protocol designed to transfer information between networked devices and runs on top of other layers of a network protocol stack.

Imagery is captured by sensors, such as Charge-Coupled Devices (CCDs) or an active-pixel sensor (such as a complementary metal-oxide-semiconductor (CMOS) image sensor). In CCDs, there is a photoactive region (an epitaxial layer of silicon), and a transmission region made out of a shift register (the CCD, properly speaking). An image is first projected through a lens onto the photoactive region of the CCD, causing each capacitor of a capacitor array to accumulate an electric charge proportional to the light intensity at that location. A one-dimensional array, used in line-scan cameras, captures a single slice of the image, whereas a two-dimensional array, used in video and still cameras, captures a two-dimensional picture corresponding to the scene projected onto the focal plane of the sensor. Once the array has been exposed to the image, a control circuit causes each capacitor to transfer its contents to its neighbor (operating as a shift register). The last capacitor in the array dumps its charge into a charge amplifier, which converts the charge into a voltage. By repeating this process, the controlling circuit converts the entire contents of the array in the semiconductor to a sequence of voltages. These voltages are then sampled, digitized, and may be stored in computer memory within client device 302, such as image memory 312.

The image memory 312, may in various aspects, be a frame buffer memory that stores the captured imagery. A frame buffer (which may also be referred to as a frame buffer, frame store, or frame grabber) is a portion of random-access memory (RAM) containing a bitmap that drives a video display, for example, rendering an image or video of the check and its immediate surrounds, for example, within the field of view of the camera. It is a memory buffer containing data representing all the pixels in a complete video frame. Modern video cards contain frame buffer circuitry in their cores. This circuitry converts an in-memory bitmap into a video signal that can be displayed on a computer monitor, such as a mobile computing device display. While frame buffers are commonly accessed via a memory mapping directly to the CPU memory space, this is not the only method by which they may be accessed. Frame buffers have varied widely in the methods used to access memory. Some of the most common are mapping the entire frame buffer to a given memory range, commands to set each pixel, range of pixels or palette entry or mapping a memory range smaller than the frame buffer memory, then bank switching as necessary. The frame buffer organization may be packed pixel or planar. The frame buffer may be all points addressable or have restrictions on how it can be updated.

While described for a frame buffer, other memory configurations may be substituted without departing from the scope of the technology disclosed herein. For example, a screen buffer, a video buffer, a streaming buffer, or a virtual buffer may be implemented, to name a few. In computing, a screen buffer is a part of computer memory used by a computer application for the representation of the content to be shown on the computer display. The screen buffer may also be called the video buffer, the regeneration buffer, or regen buffer for short. Screen buffers should be distinguished from video memory. To this end, the term off-screen buffer is also used.

In some aspects, the client device may emulate the function of a frame buffer device, often for reasons of compatibility as a virtual frame buffer. The virtual frame buffer abstracts the physical method for accessing the underlying frame buffer into a guaranteed memory map that is easy for programs to access. This increases portability, as programs are not required to deal with systems that have disjointed memory maps or require bank switching.

The information in a frame buffer typically consists of color values for every pixel to be shown on the display. Color values may be stored in 1-bit binary (monochrome), 4-bit palletized, 8-bit palletized, 16-bit high color, and 24-bit true color formats. An additional alpha channel may retain information about pixel transparency. The total amount of memory required for the frame buffer depends on the resolution of the output signal, and on the color depth or palette size.

Blending model 310, resident on the client device 302, processes the live streamed check imagery from camera 308 to generate a blended image from a plurality of images. In some aspects, a client resident OCR process 314 may extract, from the blended check image, single identifiable fields, such as the payer customer name 202, MICR data field 220 identifying customer and bank information (e.g., bank name, bank routing number, customer account number, and check number), date field 208, check amount 212 and written amount 213, authentication (e.g., payee signature 222) and anti-fraud 224 (e.g., watermark), etc. In some aspects disclosed herein, the OCR process is completed before finalization of a remote deposit operation. While described as resident on the client device 302, the blended image building and OCR functionality may be performed remotely by communicating the streaming imagery data to a remote system, such as cloud banking system 316. In one aspect, the blending model 310 and/or OCR process 314 may be integrated with the mobile banking application.

While not shown, an account identification process may include single or multiple level login data from mobile banking app 304 to initiate a remote deposit. Alternately, or in addition to, extracted payee field 210 or the payee signature 222 may be used to provide additional authentication of the customer.

In one aspect, the blending model 310 communicates blended image data to cloud banking system 316. In another aspect, the blended image data is processed via OCR locally and the extracted data fields communicated to the cloud banking system 316. For example, the blended check image, individual images, or extracted data fields are communicated to and stored within file database (DB) 320 either through a mobile app server 332 or mobile web server 334 depending on the configuration of the client device (e.g., mobile or desktop). In one aspect, this is communicated through the mobile banking app 304.

Alternatively, or in addition to, a thin client (not shown) resident on the client device 302 processes the blended check images locally with assistance from cloud banking system 316. For example, a processor (e.g., CPU) implements at least a portion of the blended check image build functionality using resources stored on a remote server instead of a local memory. The thin client connects remotely to the server-based computing environment (e.g., cloud banking system 316) where applications, sensitive data, and memory may be stored.

Backend 322, may include one or more system servers processing banking deposit operations in a secure environment. These one or more system servers operate to support client device 302. API 318 is an intermediary software interface between mobile banking app 304, installed on client device 302, and one or more server systems, such as, but not limited to the backend 322, as well as third party servers (not shown). The API 318 is available to be called by mobile clients through a server, such as a mobile edge server (not shown), within cloud banking system 316. File DB stores files received from the client device 302 or generated as a result of processing a remote deposit.

Profile module 324 retrieves customer profiles associated with the customer from a registry after extracting customer data from front or back images of the financial instrument. Customer profiles may be used to determine deposit limits, historical activity, security data, or other customer related data.

Validation module 326 generates a set of validations including, but not limited to, any of: blended image quality, mobile deposit eligibility, account, transaction limits, duplicate checks, amount mismatch, MICR, multiple deposit, etc. While shown as a single module, the various validations may be performed by, or in conjunction with, the client device 302, cloud banking system 316 or third party systems or data.

Customer Accounts 328 (consistent with customer's accounts 408) includes, but is not limited to, a customer's financial banking information, such as individual, joint, or commercial account information, balances, loans, credit cards, account historical data, etc.

ML Platform 329 may include one or more trained blended check models or a ML engine to train these model(s) used to build the blended image(s). This disclosure is not intended to limit the ML Platform 329 to only a blending model generation as it may also include, but not be limited to, OCR models, remote deposit models, risk models, funding models, security models, etc.

When remote deposit status information is generated, it is passed back to the client device 302 through API 318 where it is formatted for communication and display on the client device 302 and may, for example, communicate a funds availability schedule for display or rendering on the customer's device through the mobile banking app UI 306. The UI may instantiate the funds availability schedule as images, graphics, audio, additional content, etc.

Pending deposit 330 includes a profile of a potential upcoming deposit(s) based on an acceptance by the customer through UI 306 of a deposit according to given terms. If the deposit is successful, the flow creates a record for the transaction and this function retrieves a product type associated with the account, retrieves the interactions, and creates a pending check deposit activity.

Alternatively, or in addition to, one or more components of the remote deposit process may be implemented within the client device 302, third party platforms, the cloud-based banking system 316, or distributed across multiple computer-based systems. The UI may instantiate the remote deposit status as images, graphics, audio, additional content, etc. In one technical improvement over current processing systems, the remote deposit status is provided mid-stream, prior to completion of the deposit. In this approach, the customer may terminate the process prior to completion if they are dissatisfied with the remote deposit status.

In one aspect embodiment, remote deposit system 300 tracks customer behavior. For example, did the customer complete a remote deposit operation or did they cancel the request? In some aspects, the completion of the remote deposit operation reflects a successful outcome, while a cancellation reflects a failed outcome. In some aspects, this customer behavior, not limited to success/failure, may be fed back to the ML platform 329 to enhance future training of a ML remote deposit model. For example, in some embodiments, one or more inputs to the ML remote deposit models may be weighted differently (higher or lower) to effect a predicted higher successful outcome.

FIG. 4 illustrates an example state diagram of a remote deposit system, according to some embodiments and aspects. A remote deposit 400 system may include one or more system servers processing banking deposit operations in a secure closed loop. While described for a mobile computing device, desktop solutions may be substituted without departing from the scope of the technology described herein. These system servers may operate to support mobile computing devices from the cloud. It is noted that the structural and functional aspects of the system servers may wholly or partially exist in the same or different ones of the system servers or on the mobile device itself. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 4, as will be understood by a person of ordinary skill in the art.

In one non-limiting example, a bank customer using a client device 302 (e.g., smartphone 102), operating a mobile banking app 304, frames at least a portion of a check within a field of view from an active camera (e.g., camera port opened) of client device 302. The imagery within the field of view may, in one aspect, be configured as a live stream. In one aspect, the camera imagery is streamed as encoded text, such as a byte array. This live stream of image data is processed, without requiring an image capture to be communicated to a remote deposit server, using a client device resident blending model 310 (e.g., program or ML model). In some aspects, blending model 310 performs blended image building on a live stream of image data within a current customer transaction time period. In some aspects, blending model 310 performs blended image building on a set of image frames. An OCR program 314 generates data from a plurality of fields of the check. For example, an active OCR continuously OCRs a live data stream or a real-time OCR extracts or identifies check data fields, such as, but not limited to, date, check number, payer, payee, amount, payee information, and bank information.

Active OCR is further described in U.S. Provisional Application 63/584,379, entitled "Active OCR," filed Sep. 21, 2023, and incorporated by reference in its entirety. Active OCR, includes performing OCR processing on image objects formed from a live stream of image data originating from an activated camera on a client device. The image objects may capture portions of a check or an entire image of the check. As a portion of a check image is formed into a byte array, it may be provided to the active OCR system to extract any data fields found within the byte array in real-time or near real-time. In a non-limiting example, if the live streamed image data contains an upper right corner of a check formed in a byte array, the byte array may be processed by the active OCR system to extract the origination date of the check.

While extracting identifiable data from surfaces of the check is a primary output of the OCR, additional post-processing may be needed to further confirm or verify the data. Additional post OCR processing may include, but is not limited to, verification of data extracted from the fields based on a comparison with historical customer account data found in the customer's account 408 or the payer's account. The customer's account 408, for purposes of description, may be the payee's account, the payer's account or both. Client device may connect to customer's account 408 using secured customer single or multiple level login processes to authenticate the user.

A payee's account historical information may be used to calculate a payee's funds availability 412 schedule, while a payer's account may be checked for funds to cover the check amount. In one non-limiting example, an address may be checked against the current address found in a data file of customer's account 408. In another non-limiting example, post OCR processing may include checking a signature file within customer's account 408 to verify the payee or payer signatures. It is also contemplated that a third party database can be checked for funds and signatures for checks from payers not associated with the customer's bank. Additional known OCR post processing techniques may be substituted without departing from the scope of the technology described herein.

In one aspect, remote deposit platform 410 receives the blended check image from the client device 302 and facilitates the OCRing within the remote deposit platform 410. Alternatively, or in addition to, remote deposit platform 410 receives the extracted data fields from a client resident OCRing of the blended check image. In one non-limiting example, single identifiable fields, such as the check field 206, date field 208, payee field 210, amount field 212, etc. are sequentially communicated by the client device 302 and communicated in real-time as they are detected and processed via OCR. For example the MICR line 220 that includes a string of characters including the bank routing number, the MICR, including at least the customer's account number, may be processed before other fields to immediately initiate a verification of the customer, while the OCR processes the remaining fields. In another non-limiting example, the amount fields may be processed to initiate a funds availability process before the remaining data fields have been extracted. Alternatively, or in addition to, the OCR process may have a time ordered sequence of fields to be processed. Alternatively, or in addition to, all identifiable check fields are processed simultaneously in parallel by the OCR system 314.

Remote deposit platform 410 communicates one or more data fields extracted in the OCR operations to a funds availability model 412. For example, the remote deposit platform 410 communicates customer data (e.g., name, address, account number, bank information (e.g., routing information), check number, check amount (e.g., funding amount needed), authorization and anti-fraud information (e.g., signature verifications, watermark or other check security imagery), etc. Funds availability model 412 may return a fixed or dynamically modifiable funds availability schedule to the UI 306 on client device 302. Blended check images may be stored in the customer account 408 for later use, if necessary.

Remote deposit platform 410 computes a funds availability schedule based on one or more of the received data fields, customer history received from the customer's account 408, bank funding policies, legal requirements (e.g., state or federally mandated limits and reporting requirements, etc.), or typical schedules stored within funds availability platform 412, to name a few. For example, the OCR of a blended check image identifies the MICR data as a verified data field that may be used to access a customer's account 408. This access allows the bank identified in the MICR to provide a history of the customer's account 408 to the remote deposit platform 410. Early access to the customer's account may also provide a verified customer for security purposes to eliminate or reduce fraud early in the remote deposit process.

Remote deposit platform 410 communicates a remote deposit status 414 to the customer's device. For example, the acceptance of the blended check image or the deposit is communicated. Alternatively, a request to continue pointing the camera at one or more sides of the check is communicated to and rendered as on-screen instructions on the client device 302, within one or more customer user interfaces (UIs) of the customer device's mobile banking app 304. The rendering may include imagery, text, or a link to additional content. The UI may instantiate the remote deposit status 414 as images, graphics, audio, etc. In one technical improvement over current processing systems, the remote deposit status is provided mid-stream, prior to completion of the deposit. In this approach, the customer may terminate the process prior to completion if they are dissatisfied with the remote deposit status 414.

In one embodiment, remote deposit platform 410 tracks customer behavior. For example, did the customer complete a remote deposit operation or did they cancel the request. In some aspects, the completion of the remote deposit operation reflects a successful outcome, while a cancellation reflects a failed outcome. In some aspects, this customer behavior, not limited to success/failure, may be fed back to a ML system 339 within the remote deposit platform 410 to enhance future training of a ML models or remote deposit models. For example, in some embodiments, one or more inputs to the ML funding models may be weighted differently (higher or lower) to effect a predicted higher successful outcome.

Alternatively, or in addition to, one or more components of the remote deposit flow may be implemented within the customer device, third party platforms, and a cloud-based system or distributed across multiple computer-based systems.

FIG. 5 illustrates an example diagram of a blended image build, according to some aspects. The blended image build implementation may include one or more system servers processing various banking deposit operations in a secure closed loop. While described for a mobile computing device, desktop solutions may be substituted without departing from the scope of the technology described herein. These system servers may operate to support mobile computing devices from the cloud. It is noted that the structural and functional aspects of the system servers may wholly or partially exist in the same or different ones of the system servers or on the mobile device itself. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art.

As shown, a plurality of images 504 (e.g., images 1-N) may be generated from a live camera stream from an activated camera 502. For example, the customer activates the camera by initiating a remote deposit instruction through a UI. As they hold the client device over the check, a live stream of imagery is generated. As previously described, the imagery may be converted to a byte array in the form of bit-mapped frames or be stored within a frame or video buffer as individual images before processing the blended image build process. However, each frame may be captured at different depths or angles, and may include one or more artifacts, such as lighting issues, shading, reflections, or obstructions that may make each frame less than ideal (e.g., where every pixel contains accurate data) for the purposes of extracting data fields from the check imagery. As will be described in greater detail hereafter, a blended image build reduces or eliminates errors or failings found in each individual frame. For example, a first frame may capture most of a check, but may not be framed "on-center" and therefore miss capturing pixels from a lower corner. A second frame may capture this missing lower corner and be used in a blended build to collectively capture all pixels of a check.

The imagery includes a number of pixels that make up the check within the camera field of view. These pixels may include values, such as, an amount of gray intensity (e.g., pixel content) to be displayed for that particular portion of the image. For example, pixel values may be integers that range from 0 (black) to 255 (white). The image may also include pixel data, such as, but not limited to, image contrast ratios, luminance (e.g., light intensity), gamma (e.g., smoothness), and color values, to name a few.

A frame buffer, or any of the alternative image buffers described above, may capture the series of frames. Mobile banking app 304, installed on client device 302, receives images from the camera, and stores them, at least temporarily, in an image buffer. Mobile banking app 304 may be configured with a parameter indicating the number of check images to be captured. For example, the graphical user interface provided by mobile banking app 304 may be configured to require capturing one or more front and back images of the check. The mobile computing device 302 may cache the captured images in a temporary location such as an S3 bucket (e.g., a cloud object) implemented with a cache control.

In 506, the blended check build process generates a confidence score 508 for each image in a set of images. In a first non-limiting example, by first detecting pixels that contain typed or written image components, with, for example, darker, higher contrast and common black or blue color values, a confidence score may be calculated based on an overall perceived individual image quality. In some aspects, the confidence score may be predicted by a trained ML model trained on previous images, assigned confidence scores, and corresponding quality ratings. Alternatively, or in addition to, in one aspect, a total pixel score for each image may be calculated. In a non-limiting example, Image 1 has a confidence score of 600 (e.g., out of 1000) based on a count of pixels with a pixel value below an integer value of X (e.g., below 50, where black has a score of 0 and a score of 50 is shade of dark gray). While described for an integer value of below 50, any pixel value number or range may be selected without departing from the scope of the technology described herein. For example, in some aspects, only pixels in a range of pixel values (e.g., range of known marking pixel values) may be processed, without processing the remaining pixels. For example, those pixels that only include a high pixel value (i.e., lighter pixel gray values), such as, a background color of the check may not be included in a generated confidence score. In some aspects, pixels that capture preprinted border pixels also may not be considered in the confidence score. In this aspect, the previously discussed ML models may be trained to recognize the values that represent the written or typed information as well as the preprinted borders. For example, using machine learning, thousands or millions of images may be processed to learn to accurately recognize and categorize these pixels.

Alternatively, or in addition to, segments or blocks within known data field areas on the check may be processed. Using supervised learning, thousands or millions of images may be processed to learn to recognize a check type and common data field locations relative to a border of the check. Alternatively, or in addition to, the two methods described above may be combined.

In 510, the blended check build process selects a number of highest confidence scores. The number of selections may be based on any of, a preset number, a percentage of the total number of images in the set, or only those images above a selectable confidence score, to name a few. As shown in FIG. 5, images 7, 4, 10, 9 and 1 have the highest confidence scores of 950, 900, 745, 675 and 600, respectively. In some aspects, the number of selections may be predicted by a trained ML model trained on previous blended builds.

In 514, the blended check build process ranks the selected X highest confidence scored images by confidence score-highest to lowest scores 516. In one aspect, the ranking may be configured as an overlay implemented as a multi-layer buffer, wherein an image having the highest confidence score is stored in a bottom layer and the remainder of the images are overlaid based on descending confidence scores (e.g., the image having the highest confidence score is on the bottom and the image having the lowest confidence score is on the top). While described for a multi-layer buffer, the images may be arranged in a virtual buffer without departing from the scope of the technology disclosed herein. In this second approach, the images are not graphically overlaid, but the common pixels from each image are related based on the above described confidence score ordering. For example, each common pixel from each image may be labeled with a common metadata designation or position indicator (e.g., pixel Row 1, Column 1). In the virtual buffer approach, image frames may be aligned in real-time and an order of highest-to-lowest frame confidence scores continuously resorted as they are scored. In either aspect, the images may be continuously resorted as images are received, may be first rectified to correct for distortions based on an angle of incidence, may be rotated to align the images, may be filtered to remove obstructions or reflections, or may be resized to allow same size image overlay configurations. In one aspect, these corrections may be based on recognition of corners or borders of the check. If the pixels from a series of image frames are aligned, the system may implement a pixel grid to compare common pixels from differing image frames.

While variations of blending approaches will be described hereafter, if an image frame is scored as perfect (e.g., a score of 1000) or above a quality threshold (e.g., 975/100), the process may be terminated and that image used for subsequent OCR processing.

In 518, the blended check build process generates weighting values for each image frame in the overlay 520—highest to lowest. In a non-limiting example, the weighting may be implemented as a transparency value where the bottom layer (e.g., highest confidence score) will be opaque, with no transparency. Each layer above the lowest layer may be assigned an increased transparency. For multiple images of a same confidence score, the layering may be based on sequence of reception, first received to last received. Alternatively, when an additional image is received with a same confidence score, it may be discarded. For example, when the transparencies of each layer increase from lowest to highest, the weighting or impact of each lower scored image decreases accordingly. In some aspects, each pixel will be modified by a transparency percentage or value, with each ascending layer's pixel gray shading level being reduced in a greater proportion. In this weighted approach, as the system considers a blending of common pixels from each image frame, the highest confidence scored frames (e.g., highest quality images) will have a greater impact in the final blended check image. For example, images with high quality dark or black pixels may generate a higher quality blended image when blended. One or more trained ML models may assist the blended image app to implement optimum transparency assignments.

In 522, the blended check build process blends pixels data values for each common pixel in the overlay structure, resulting in a blended check image 524 with a higher confidence or quality score. Blending of pixel data, derived from a plurality of common pixels, provides a technical solution to overcome errors that may be associated with individual or contiguously arranged pixels (e.g., blurriness, shading, missing pixels, etc.) that may occur in a single image, but, in a blended image, will have a diminished negative effect. Blending processes will be described in greater detail below. While described for blending a single pixel value, such as color (e.g., black or gray), any number of pixel data values may be blended using any of the blending approaches disclosed herein. While specific approaches will be described, the technology described herein is not limited thereto. For example, additional approaches or a combination of approaches may be substituted without departing from the scope disclosed herein.

In one approach, the pixel values with errors may be processed first to remove noise from each image. For example, pixels that contain no data may be disregarded in a subsequent blending process. In another example, pixels with data values that do not match the camera settings (e.g., focal distance, contrast, ambient light, etc.) may be disregarded. In another example, when a majority of pixel values for a given pixel location in a set of images (e.g., nine out of ten) show one common data value (e.g., a black pixel), the minority data value(s) (e.g., the one pixel value at the given pixel location) may be disregarded or may be modified to match the majority pixel value at the pixel location. In another example, all images with a confidence score below a threshold score may be disregarded and the remaining images ranked for use in the blended build process as described herein. For example, if nine images have a confidence score of 900+, and one has a confidence score of 300, the image with the confidence score of 300 may be disregarded. However, if all of the images have a low confidence score (e.g., 500), they still may benefit from one or more of the blending approaches disclosed herein.

In a non-limiting blending example, each of the processed pixels, as modified by transparency values, is combined or aggregated. The blended image may be compared to known quality thresholds continuously throughout the blended image build process or after completion. In some aspects, the blended image build may continue, be modified (e.g., change the number of confidence scores, the number of selected image frames for overlay or the assigned transparency values), or be repeated until meeting the quality threshold. For example, a ML blending model may be trained to recognize an optimum number of image frames to be selected, optimum confidence scores (e.g., discard images below a selected confidence score), optimized transparency escalation metrics (e.g., selection of transparency for each level of the overlay), or combinations of confidence scores that will produce a blended image meeting or exceeding the threshold. For example, the model determines that additional images over a selected confidence value are needed to combine to meet a quality threshold. In this example, the activated camera would remain active until the targeted imagery is available. For example, for low light environments, a higher number of image frames may need to be selected for the blended check image build.

In some embodiments, the blending is capped out at a blended confidence score, based on achieving a selected perceived high quality. For example, when blending pixel data, the blending may be completed when achieving a total confidence score near 900 or a blended pixel value equating to or near black. In this approach, a series of varying gray or black pixels contrast values are added together (as modified by a transparency value) from each layer of the overlay configuration with a goal to achieve as dark a blended pixel as needed to allow a successful OCR processing of the image. For example, a highest confidence scored image may have no reduction based on transparency, while a lower confidence scored image may have its values greatly reduced by a percentage of transparency. In this example, a black pixel of high confidence scored imagery may contribute highly to the final blended pixel value, while a light gray pixel from a low confidence scored image may add little or no value to a final blended pixel value.

In another non-limiting blending example, a concentration value may be obtained from the common pixels between images. For example, if a majority of the common pixels have a specific pixel value, then that pixel value is the final blended value for that pixel in the blended image build.

In another non-limiting blending example, a fair value for a blended pixel value may be determined by averaging values of common pixels from each of the confidence ranked images.

In another non-limiting blending example, a blended pixel value may be determined by weighting a plurality of pixel value parameters. For example, weighting a pixel's contrast value higher than its color value, when blending these weighted multiple parameters.

In some aspects, the blended check will only include marking pixels (e.g., typed or written markings) and therefore reduce OCR processing times. In some aspects, where the border and background pixels were not included in the confidence scores or pixel values, the color and border pixel values of the highest quality check image may be added back into the pixels of the frame of the blended check image to provide a blended check image that resembles the original check.

The solutions described above improve upon current remote deposits processes. The various aspects solve at least the technical problem that current systems do not generate a high quality blended check image pre-deposit and/or require requesting additional images post check image processing. In addition, in some aspects, the technical solution processes only detected written or typed pixels and therefore reduces processing and memory requirements and therefore may improve remote deposit processing times and more efficiently utilize the limited system resources of a mobile device.

Figure 6:
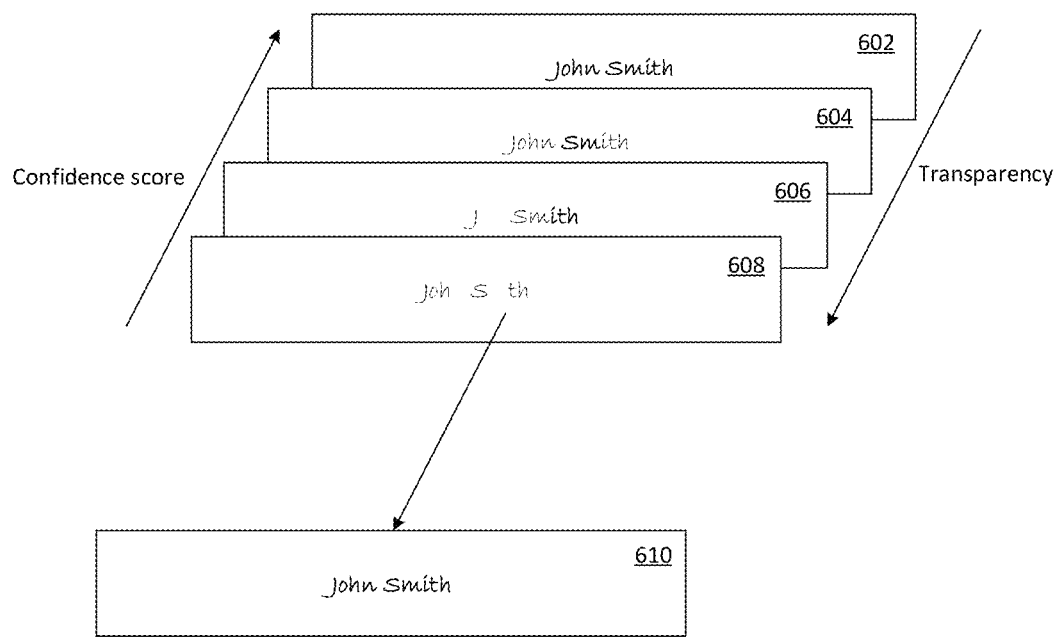
FIG. 6 illustrates an example diagram of a portion of a blended image build, according to embodiments and aspects.

FIG. 6 illustrates another example diagram of a portion of a blended image build, according to embodiments and aspects. In some aspects, a known position of a data field may allow a focused selection of pixel values to consider in the confidence score generation. For example, a personal check has seven data fields where an OCR process may need to extract check data to process the check for remote deposit. As shown, pixels from a signature data field are selected as part of the overall process for generating the confidence score. The other six fields may be processed in a similar manner by selecting pixels that have pixel values that reflect written or typed text of a high intensity or contrast ratio in areas of expected data. As shown, a high confidence score signature is captured by signature 602 and is arranged in an overlay of images along with images 604, 606, and 608, wherein the overlay of images has descending confidence scores and increasing transparencies. When the pixel content of the overlaid signatures are blended, the final blended image of the signature field 610 produces a high quality signature 610 that may be subsequently OCR processed with a higher degree of success than if any of images 602-608 had been individually OCR processed.

Figure 7:
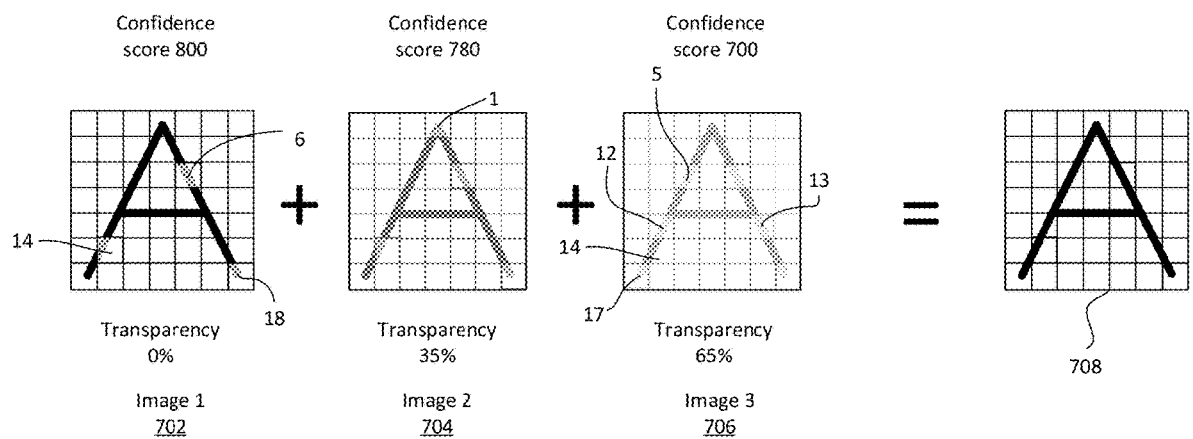
FIG. 7 illustrates another example diagram of a portion of a blended image build, according to embodiments and aspects.

FIG. 7 illustrates another example diagram of a portion of a blended image build, according to embodiments and aspects. While described for a single letter for simplicity purposes, the process as disclosed may be applied to any portion of the check image frame, including each of the fields described above with respect to FIG. 2. In a non-limiting example, a letter "A" may be captured by a number of pixels (e.g., shown as 18 pixels). However, as shown in "Image 1" 702, some pixels may not retain a high quality pixel (e.g., black), shown as pixels 6, 14, and 18. This may be a result of lighting, reflections, wrinkles or damage to a check, or simply ink quality variations, to name a few. As such, Image 1 may generate a high, but not perfect, confidence score of 800. Additional images, "Image 2" 704 and "Image 3" 706 are selected also with high confidence scores of 780 and 700. However, Image 2 (704) has additional low quality pixels for pixel 1 and Image 3 (706) has additional low quality pixel values 5, 12, 13, and 17. In the blended check image build, the three images (702, 704, and 706) are arranged in an overlay of descending confidence scores and increasing transparencies. When the pixel content of the overlaid common pixels is blended, the final blended image 708 produces a high quality letter "A" that may be subsequently OCR processed with a higher degree of success than if any of images 1-3 had been individually OCR processed.

Figure 8:
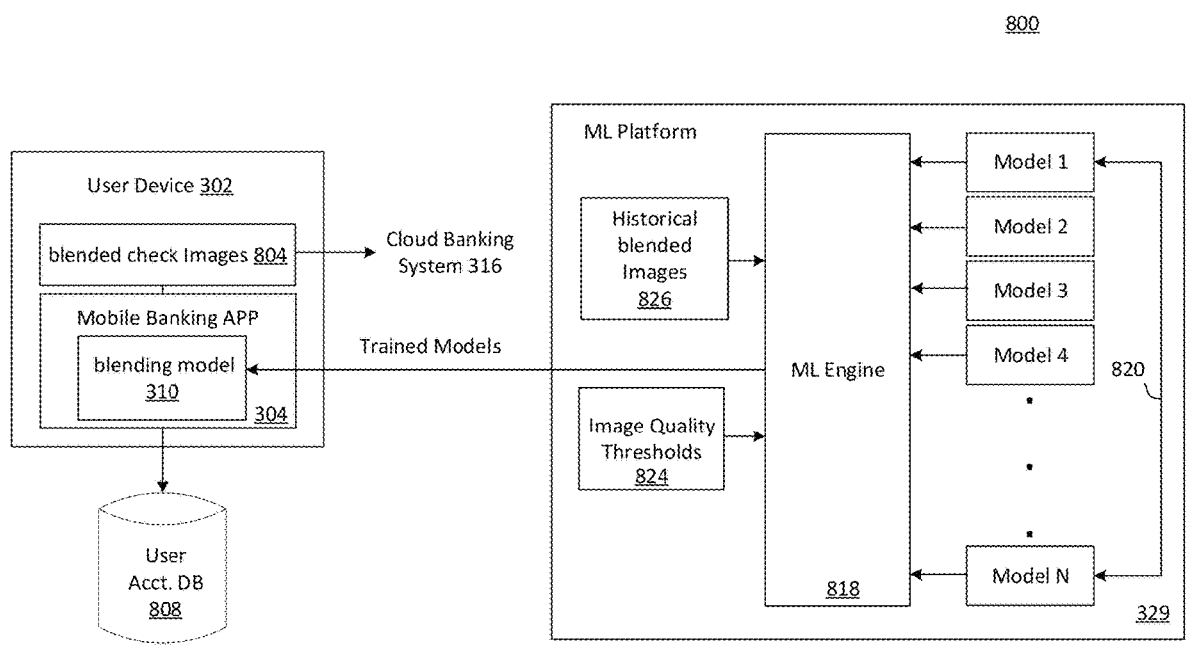
FIG. 8 illustrates a block diagram of a ML system, according to some embodiments and aspects.

FIG. 8 illustrates a block diagram of a ML system, according to some embodiments and aspects. The blended image build implementation may include one or more system servers processing various banking deposit operations in a secure closed loop. While described for a mobile computing device, desktop solutions may be substituted without departing from the scope of the technology described herein. These system servers may operate to support mobile computing devices from the cloud. It is noted that the structural and functional aspects of the system servers may wholly or partially exist in the same or different ones of the system servers or on the mobile device itself. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 8, as will be understood by a person of ordinary skill in the art.

In some aspects, a blending model 310 may be processed locally on the client device 302 to improve blended check build performance, such as accuracy, quality and speed, to name a few. In various aspects, blending model 310 may be a standalone model or be integrated within mobile banking app 304. Check images 804 may be processed by the blending model 310 to predict formulations of optimum confidence scores, optimized check image selections, and optimum transparency assignments to individual image frames that would achieve a quality threshold blended check image for OCR processing purposes.

Training of the blending model 310 may occur remotely from the client device 302 (e.g., in ML platform 329) and be communicated to the client device 302 as the ML model(s) 820 are trained and updated. Training may include exposing the ML models to hundreds, thousands, or more of historical blended images 826, where specific confidence scores, number of high confidence score selections, and assigned transparencies are included as metadata with the blended images. Image quality thresholds 824 may be selectable and varied during the training process to generate an optimized threshold based on a historical correlation with OCR extracted data fields. ML models 820 may each have varied metadata weightings, performance weightings, or quality weightings, but are not limited to these parameter weightings. One skilled in ML would appreciate that any of the parameters used in the blended check image builds, such as, but not limited to, quality or performance targets may have weighting varied without departing from the scope of the technology disclosed herein.

Machine learning may involve computers learning from data provided so that they carry out certain tasks. For more advanced tasks, it can be challenging for a human to manually create the needed algorithms. This may be especially true of teaching approaches to correctly identify patterns. The discipline of machine learning therefore employs various approaches to teach computers to accomplish tasks where no fully satisfactory algorithm is available. In cases where vast numbers of potential answers exist, one approach, supervised learning, is to label some of the correct answers as valid or successful. For example, a high quality blended image may be correlated with a confidence score based on a number of images selected, confidence score, and assigned transparencies. This may then be used as training data for the computer to improve the algorithm(s) it uses to determine future successful outcomes.

The predictive models 820 (e.g., 1-N) may classify customer's historic blended image data based on a positive result of OCR extracted data or by negative labels (e.g., low quality or missing extractions, etc.) against the trained predictive model to predict successful blended image builds and generate or enhance a previous generated model. In one embodiment, the ML models (e.g., models 820, 1-N) are continuously updated as new user financial interactions occur.

Images received from the client device, including the blended check images used in the OCR process, may be stored in the User Account DB 808. User Account DB 808 may also store user profile information that may be used with the remote deposit platform 410 to provide account and profile information based on associated identifiers (IDs). Additionally, as specific funds availability schedules 314 are presented to the user, for example, as rendered on their user device 302 through mobile banking app 304, the historical information may be added to the user's profile and further be stored in the User Account DB 808.

As shown, a series of desired models 820, 1-N, may be fed into the ML Engine 818 as predictor models to select a model that may result in optimum extracted check data (e.g., amount, etc.). The model(s) 820 may be trained and continuously improved by analyzing relative success over a large data set, where success is measured by quality OCR data field extractions. ML models 820 may be focused to generate queries for a specific performance level, for example an image quality threshold 824.

In some aspects, the ML engine may continuously change weighting of model inputs to increase blended check builds. For example, weighting of specific confidence score parameters (e.g., pixel values), transparencies or equivalents may be continuously modified in the model to trend towards greater success. Conversely, term weighting that lowers successful user interactions may be lowered or eliminated.

Alternatively, or in addition to, one or more components of the ML platform 329 may be implemented within the user's mobile device, third party platforms, and a cloud-based system or distributed across multiple computer-based systems.

Example Computer System

Figure 9:
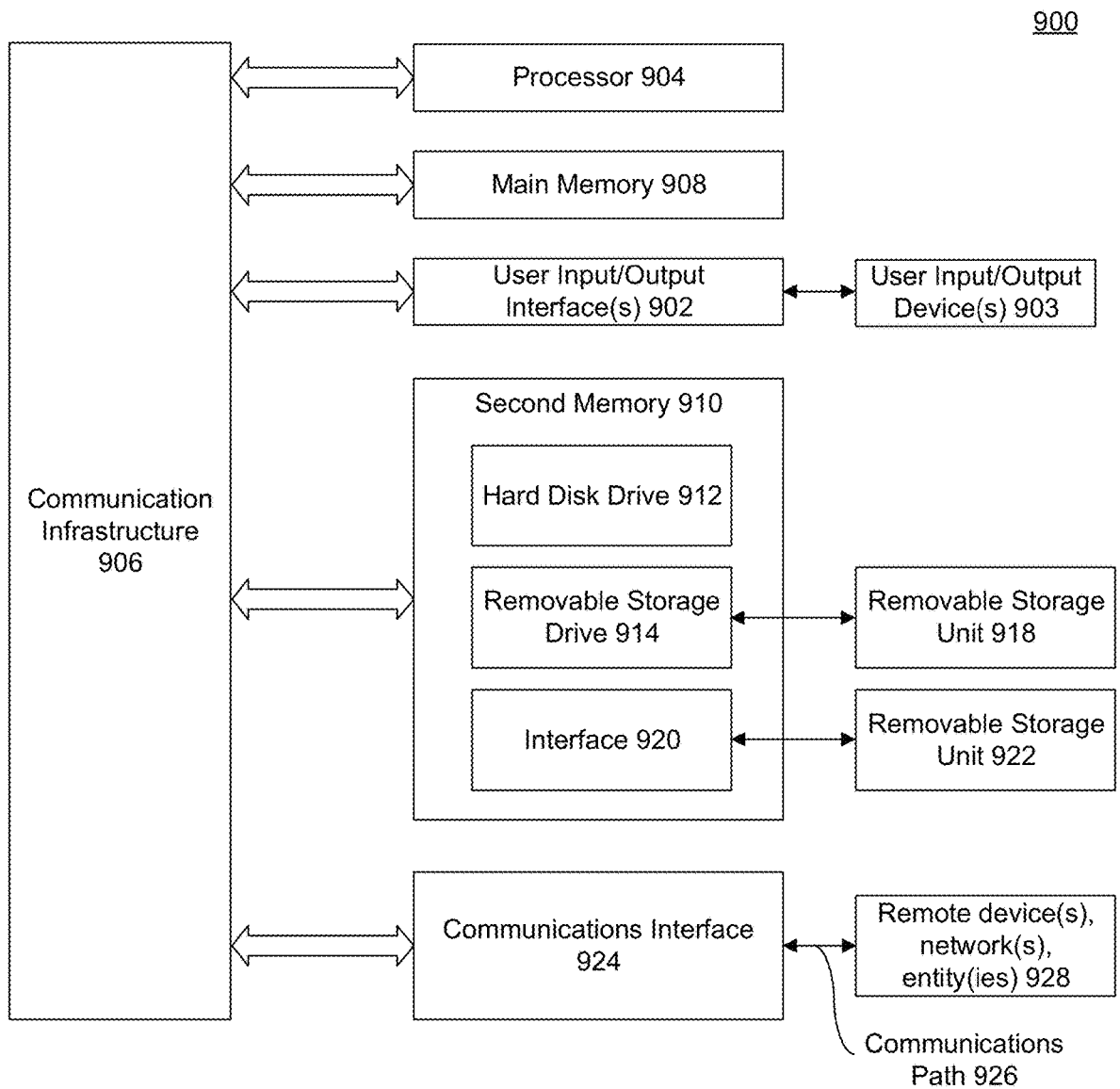
FIG. 9 illustrates an example computer system useful for implementing various embodiments and aspects.

FIG. 9 depicts an example computer system useful for implementing various embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for remote deposit using a client device, comprising:
   activating, on the client device, a remote deposit application;
   activating, based on receiving a user request to initiate a remote deposit, a camera on the client device, wherein the camera provides access to a field of view of the camera;
   capturing, by the camera, a plurality of images of a financial instrument;
   generating a confidence score for each of the plurality of images of the financial instrument;
   selecting, based on the confidence score, a set of images from the plurality of images of the financial instrument, wherein the set of images comprises X highest confidence scored images from the plurality of images of the financial instrument, wherein X is an integer selected by a trained machine learning (ML) model;
   ranking individual images of the set of images from a highest to lowest confidence score;
   assigning, based on a respective ranking, a weighting value to each image of the set of images;
   building a blended image by blending pixel content of common pixels between images of the set of images, as modified by the weighting value assigned to each image of the set of images; and
   communicating the blended image to a remote deposit server.

2. The computer-implemented method of claim 1, wherein the plurality of images of the financial instrument are derived from a stream of live camera imagery formed into a byte array.

3. The computer-implemented method of claim 1, wherein the ranking from highest to lowest confidence scores comprises positioning an image with the highest confidence score on a bottom layer of a graphical overlay, with each of the remaining images layered in descending confidence score order.

4. The computer-implemented method of claim 3, wherein the assigning, based on the respective ranking, a weighting value to each image of the set of images, comprises assigning an image with the highest confidence score a lowest transparency value and each of the remaining images an ascending transparency value.

5. The computer-implemented method of claim 4, wherein the assigning, based on the respective ranking, a transparency value to each image of the set of images comprises selecting optimized transparency values based on the trained machine learning (ML) model.

6. A system, comprising:
   a memory; and
   at least one processor coupled to the memory and configured to:
   activate, on a mobile device, a remote deposit application;

activate, based on receiving a user request to initiate a remote deposit, a camera on the mobile device, wherein the camera provides access to a field of view of the camera;

capture, by the camera, a plurality of images of a financial instrument;

generate a confidence score for each of the plurality of images of the financial instrument;

select, based on the confidence score, a set of images from the plurality of images of the financial instrument, wherein the set of images comprises X highest confidence scored images from the plurality of images of the financial instrument, wherein X is an integer selected by a trained machine learning (ML) model;

rank individual images of the set of images from a highest to lowest confidence score;

assign, based on a respective ranking, a weighting value to each image of the set of images;

build a blended image by blending pixel content of common pixels between images of the set of images, as modified by the weighting value assigned to each image of the set of images; and communicate the blended image to a remote deposit server.

7. The system of claim 6, wherein the plurality of images of the financial instrument are derived from a stream of live camera imagery formed into a byte array.

8. The system of claim 6, wherein the ranked individual images of the set of images from the highest to lowest confidence score are configured as a graphical overlay within a frame buffer.

9. The system of claim 6, wherein the ranked individual images of the set of images from the highest to lowest confidence score are configured as a graphical overlay within a virtual frame buffer.

10. The system of claim 6, wherein the ranking, from highest to lowest confidence scores, comprises positioning an image with the highest confidence score on a bottom layer of a graphical overlay, with each of the remaining images layered in descending confidence score order.

11. The system of claim 10, wherein the assigning, based on the respective ranking, a weighting value to each image of the set of images, comprises assigning an image with the highest confidence score a lowest transparency value and each of the remaining images an ascending transparency value.

12. The system of claim 11, wherein the assigning, based on the respective ranking, a transparency value to each image of the set of images comprises selecting optimized transparency values based on the trained machine learning (ML) model.

13. A non-transitory computer-readable device having instructions stored thereon that, when executed by at least one computing device, cause the at least one computing device to perform operations comprising:

activating, on the at least one computing device, a remote deposit application;

activating, based on receiving a user request to initiate a remote deposit, a camera on the at least one computing device, wherein the camera provides access to a field of view of the camera;

capturing, by the camera, a plurality of images of a financial instrument;

generating a confidence score for each of the plurality of images of the financial instrument;

selecting, based on the confidence score, a set of images from the plurality of images of the financial instrument, wherein the set of images comprises X highest confidence scored images from the plurality of images of the financial instrument, wherein X is an integer selected by a trained machine learning (ML) model;

ranking individual images of the set of images from a highest to lowest confidence score;

assigning, based on a respective ranking, a weighting value to each image of the set of images;

building a blended image by blending pixel content of common pixels between images of the set of images, as modified by the weighting value assigned to each image of the set of images; and communicating the blended image to a remote deposit server.

14. The non-transitory computer-readable device of claim 13, wherein the plurality of images of the financial instrument are derived from a stream of live camera imagery formed into a byte array.

15. The non-transitory computer-readable device of claim 13, wherein the ranking the individual images, from highest to lowest confidence scores, comprises operations that position an image with the highest confidence score on a bottom layer of a graphical overlay with each of the remaining images layered in descending confidence score order.

16. The non-transitory computer-readable device of claim 15, wherein the assigning, based on the respective ranking, a weighting value to each image of the set of images comprises operations selecting optimized transparency values based on the trained machine learning (ML) model.

17. A computer-implemented method using a client device, comprising:

activating, based on receiving a user request to initiate a remote document build process, a camera on the client device, wherein the camera provides access to a field of view of the camera;

capturing, by the camera, a plurality of images of a document;

generating a confidence score for each of the plurality of images of the document;

selecting, based on the confidence score, a set of images from the plurality of images of the document, wherein the set of images comprises X highest confidence scored images from the plurality of images of the financial instrument, wherein X is an integer selected by a trained machine learning (ML) model;

ranking individual images of the set of images from a highest to lowest confidence score;

assigning, based on a respective ranking, a weighting value to each image of the set of images;

building a blended image by blending pixel content of common pixels between images of the set of images, as modified by the weighting value assigned to each image of the set of images; and communicating the blended image to a remote server.

* * * * *